United States Patent
Yoon

(10) Patent No.: US 8,977,456 B2
(45) Date of Patent: Mar. 10, 2015

(54) METHOD OF PREDICTING TRANSFER TORQUE OF DRY CLUTCH IN VEHICLE

(71) Applicants: Hyundai Motor Company, Seoul (KR); Kia Motors Corp., Seoul (KR)

(72) Inventor: Young Min Yoon, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 98 days.

(21) Appl. No.: 13/827,388

(22) Filed: Mar. 14, 2013

(65) Prior Publication Data

US 2014/0188357 A1    Jul. 3, 2014

(30) Foreign Application Priority Data

Dec. 28, 2012    (KR) .................. 10-2012-0156308

(51) Int. Cl.
| | | |
|---|---|---|
| G06F 17/00 | (2006.01) | |
| B60W 10/02 | (2006.01) | |
| F16D 48/06 | (2006.01) | |

(52) U.S. Cl.
CPC .................................... *F16D 48/06* (2013.01)
USPC ............................................... 701/68; 477/5

(58) Field of Classification Search
CPC .............. A61M 2205/6018; F04B 2203/0207; F04B 43/08; F04B 43/082; F04B 49/065; B60W 10/08; B60W 2510/0241; B60W 2510/1005; B60W 10/02; B60W 10/026; B60W 10/113; B60W 2510/1025; B60W 2510/105; B60W 2710/023
USPC ........... 701/22, 42, 68, 54; 903/946; 180/446, 180/65.28; 477/143, 156
See application file for complete search history.

(56) References Cited

U.S. PATENT DOCUMENTS

| | | | | |
|---|---|---|---|---|
| 4,629,045 A | * | 12/1986 | Kasai et al. ............... | 477/86 |
| 2010/0113218 A1 | | 5/2010 | Herter et al. | |
| 2010/0250037 A1 | * | 9/2010 | Yoshida et al. ............ | 701/22 |

FOREIGN PATENT DOCUMENTS

| | | |
|---|---|---|
| JP | 2003-278806 A | 10/2003 |
| JP | 2004-197861 A | 7/2004 |
| JP | 2008-275036 A | 11/2008 |
| KR | 10-0417494 B1 | 4/2004 |
| KR | 10-0904778 B1 | 6/2009 |

* cited by examiner

*Primary Examiner* — Muhammad Shafi
(74) *Attorney, Agent, or Firm* — Morgan, Lewis & Dockius LLP

(57) ABSTRACT

A method predicts transfer torque of a dry clutch in a vehicle, in which a characteristic of transfer torque of the dry clutch caused by a stroke of a clutch actuator is accurately detected in a process of detecting a characteristic of a transmission when the vehicle is finished in an assembly line, and is applied to the control of the dry clutch using the clutch actuator, thereby previously preventing a phenomenon in which an excessive slip and an impact occur at the dry clutch and thus improving shift performance, for instance, securing durability of the dry clutch, or obtaining smooth shift feeling.

4 Claims, 4 Drawing Sheets

METHOD OF PREDICTING TRANSFER TORQUE OF DRY CLUTCH IN VEHICLE

CROSS-REFERENCE TO RELATED APPLICATION

The present application claims priority of Korean Patent Application Number 10-2012-0156308 filed Dec. 28, 2012, the entire contents of which application is incorporated herein for all purposes by this reference.

BACKGROUND OF INVENTION

1. Field of Invention

The present invention relates generally to technology for predicting transfer torque of a dry clutch disposed between an engine and transmission of a vehicle and, more particularly, to technology capable of accurately predicting a relationship between a transfer torque of a dry clutch and an operating stroke of an actuator so as to be able to properly control the dry clutch, used for an automatic transmission such as an automated manual transmission (AMT), using the actuator.

2. Description of Related Art

Automatic transmissions (A/Ts) such as an automated manual transmission (AMT) or a double clutch transmission (DCT) are systems designed to automatically control a manual transmission mechanism, and to transmit engine torque to a transmission mechanism using a dry clutch, unlike typical A/Ts that use a torque converter and a wet multiplate clutch.

The dry clutch has a characteristic that transfer torque thereof is greatly changed due to various factors such as a tolerance, a degree of wear, durability, and thermal deformation caused by high temperature in each part, and a change in frictional coefficient of a disk. As such, it is difficult to convert the transfer torque of the dry clutch into reliable data.

The dry clutch is controlled by an actuator. Typically, as shown in FIG. 1, the actuator is controlled by a T-S curve showing a change of the transfer torque of the dry clutch relative to a stroke of the actuator. As described above, since the transfer torque of the dry clutch is greatly changed by various factors, the dry clutch is subjected to an excessive slip or an impact when a characteristic of the transfer torque fails to be properly reflected during control of the dry clutch. Thus, technology of accurately detecting the characteristic of the transfer torque of the dry clutch so as to be used to control the actuator is required.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art, and the present invention is intended to propose a method of predicting transfer torque of a dry clutch in a vehicle, in which a characteristic of transfer torque of the dry clutch caused by a stroke of a clutch actuator is accurately detected in a process of detecting a characteristic of a transmission when the vehicle is finished in an assembly line, and is applied to the control of the dry clutch using the clutch actuator, thereby previously preventing phenomena of an excessive slip and an impact of the dry clutch and thus improving shift performance, for instance, enhancing durability of the dry clutch, or obtaining a smooth shift feeling.

Various aspects of the present invention provide for a method of predicting transfer torque of a dry clutch in a vehicle, which includes: a first preparing process of operating a brake after an engine is started; a first driving process of driving an actuator to engage a clutch that has been disengaged; and a first predicting process of measuring a stroke of the actuator and resulting engine torque during the first driving process and storing the measured torque as clutch transfer torque based on the stroke of the actuator.

According to the method of predicting transfer torque, a characteristic of transfer torque of the dry clutch caused by a stroke of a clutch actuator is accurately detected in a process of detecting a characteristic of a transmission when the vehicle is finished in an assembly line, and is applied to the control of the dry clutch using the clutch actuator. Thereby, it is possible to prevent previous phenomena of an excessive slip or an impact of the dry clutch, and thus improve shift performance by, for example, enhancing durability of the dry clutch, or obtaining a smooth shift feeling.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
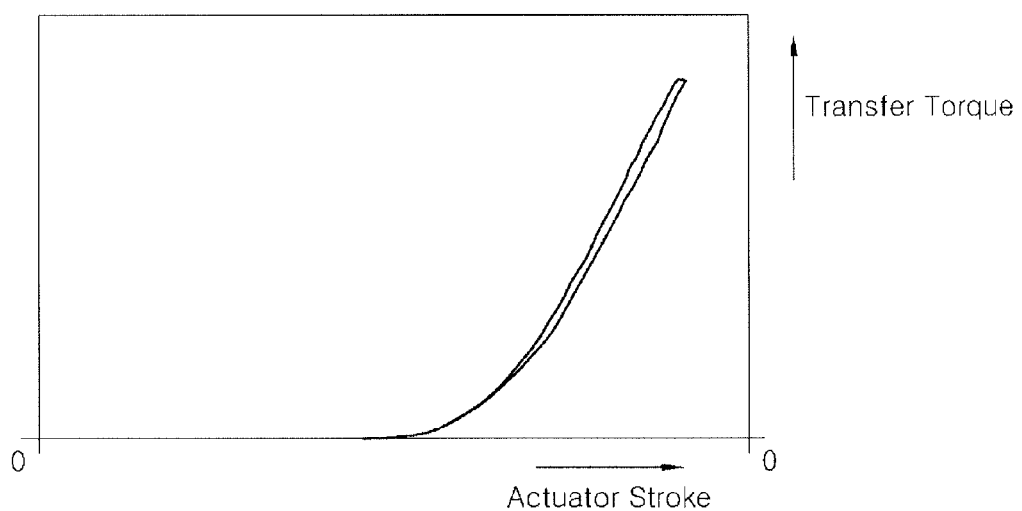
FIG. 1 is a T-S curve graph showing a change of the transfer torque of the dry clutch relative to a stroke of the actuator.
Figure 2:
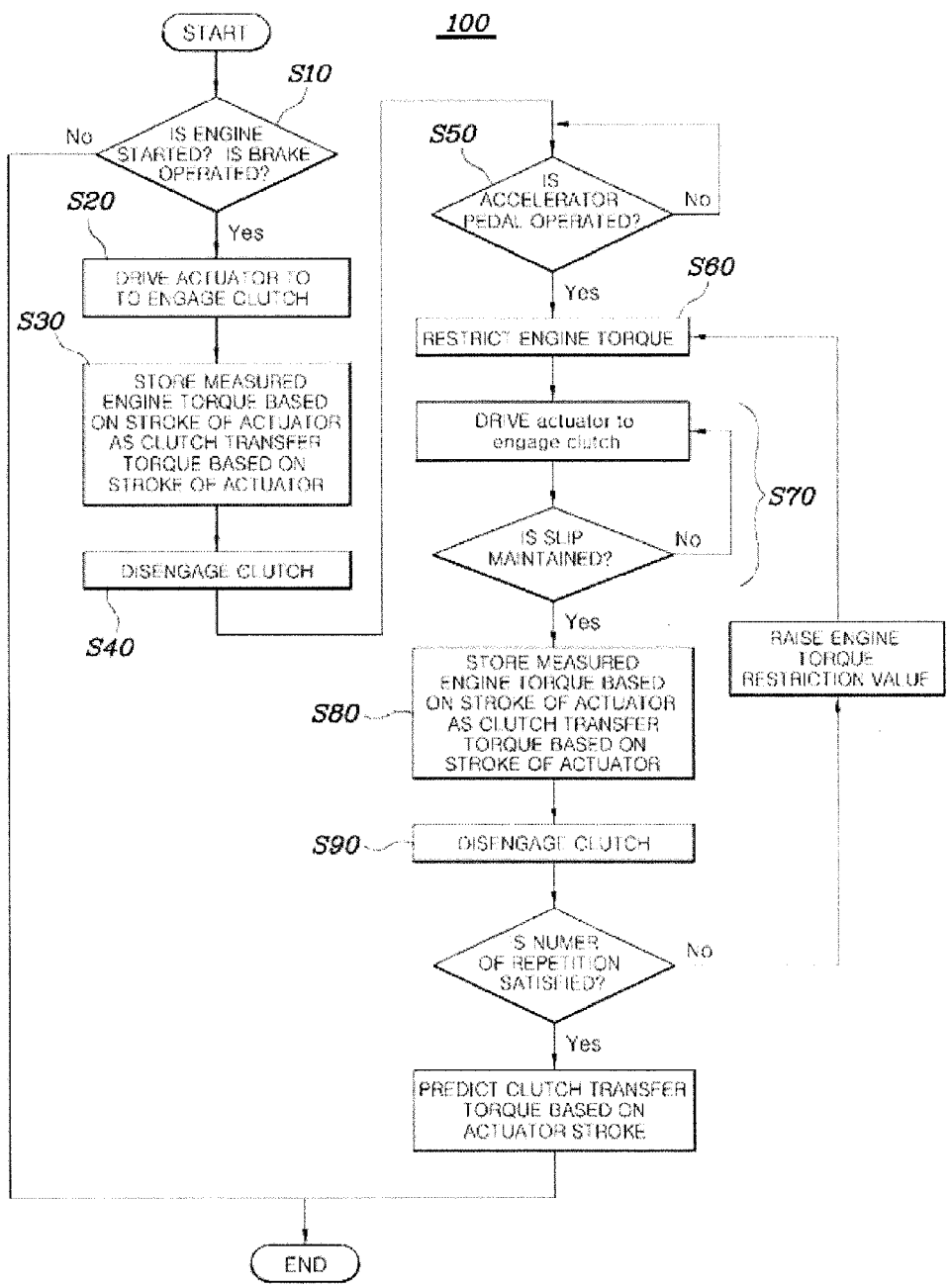
FIG. 2 is a flow chart showing an exemplary method of predicting transfer torque of a dry clutch in a vehicle in accordance with the present invention.
Figure 3:
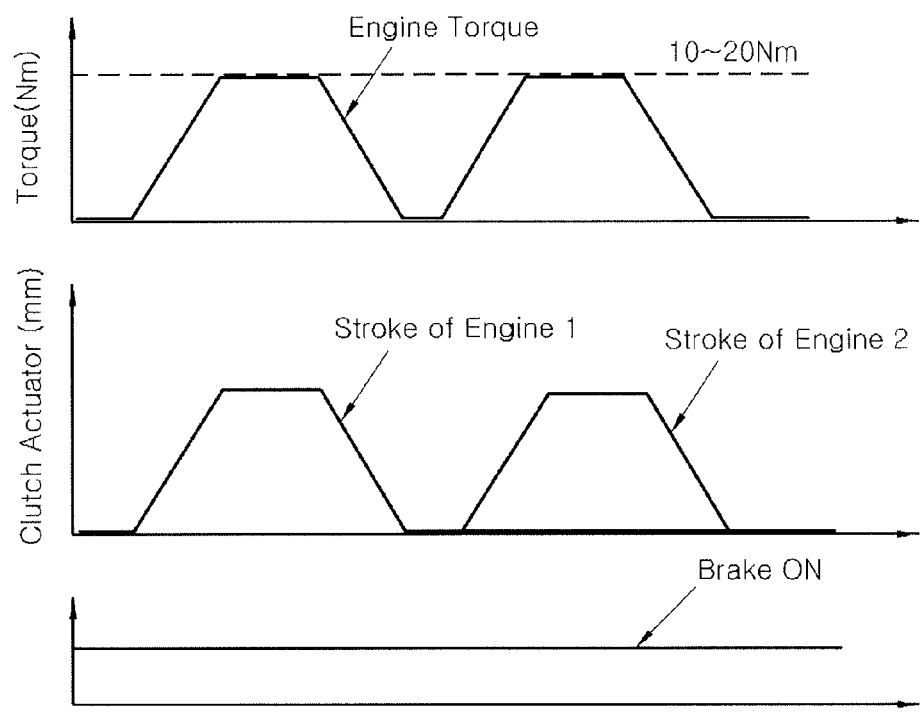
FIG. 3 is a view for describing a first driving process and a first predicting process in the exemplary method of FIG. 2 using a graph.
Figure 4:
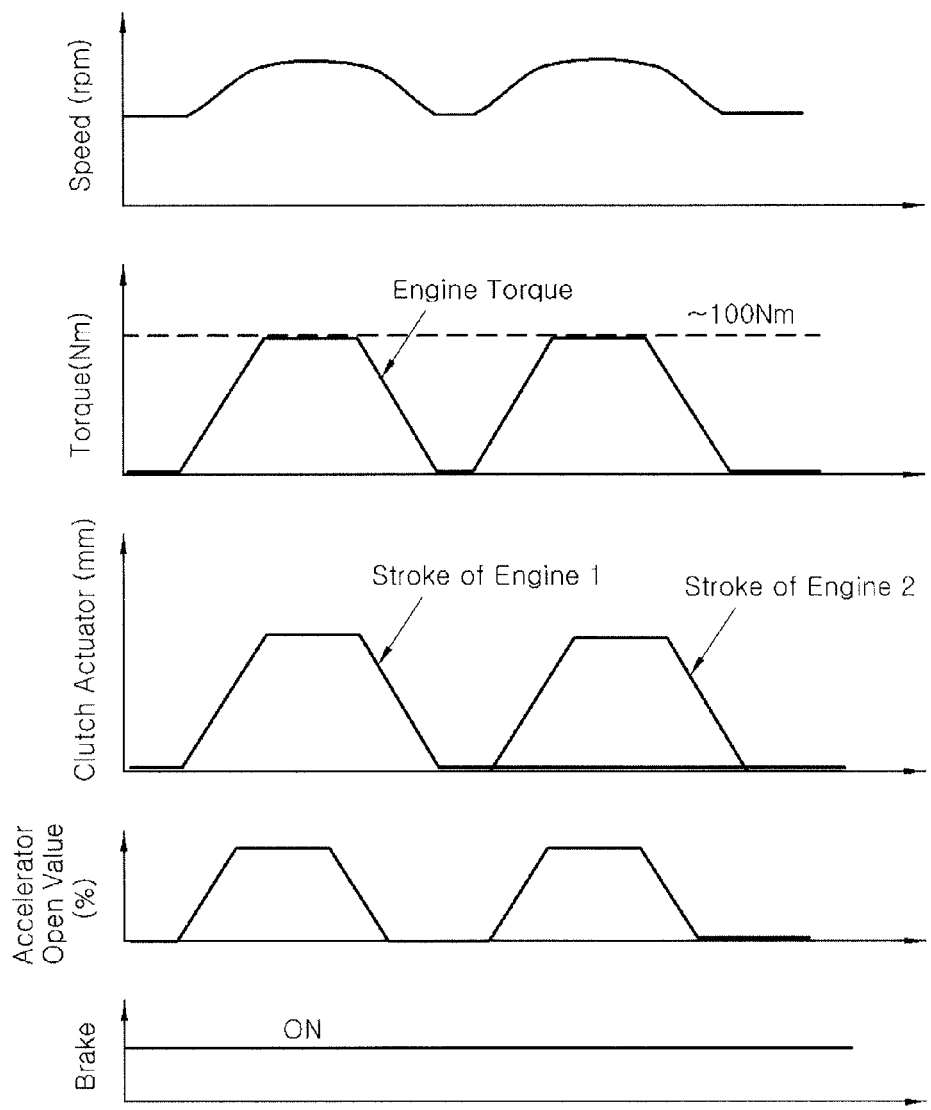
FIG. 4 is a view for describing a second driving process and a second predicting process in the exemplary method of FIG. 2 using a graph.

Referring to FIGS. 2 to 4, a method of predicting transfer torque of a dry clutch in a vehicle in accordance with various embodiments of the present invention includes a first preparing process S10 of operating a brake after an engine is started, a first driving process S20 of driving an actuator to engage a clutch that has been disengaged, and a first predicting process S30 of measuring a stroke of the actuator and resulting engine torque during the first driving process S20 and storing the measured torque as clutch transfer torque based on the stroke of the actuator.

In detail, after the engine is started and then the brake is operated in the first preparing process S10, when the actuator is driven by a controller 100 to engage the clutch in the first driving process S20, a load is applied to the engine via the clutch. In this case, idle control logic in the controller 100 for causing the engine to maintain an idle speed is operated to increase the engine torque in proportion to the load applied via the clutch. The engine torque is measured. Since the measured engine torque can be regarded as the clutch transfer torque, the engine torque based on the clutch actuator stroke is stored as the clutch transfer torque based on the clutch actuator stroke.

Thus, the first driving process S20 and the first predicting process S30 are performed when the engine is in an idle state. A second driving process S70 and a second predicting process S80, which will be described below, are performed to predict the clutch transfer torque on a relatively higher torque region when an accelerator pedal is operated to drive the engine out of the idle state.

Referring to FIG. 3, in the first driving process S20, a maintenance period in which the stroke of the actuator is maintained with no change while the actuator is driven to engage the clutch and then to disengage the clutch is included. Here, the clutch is in a slip state to some extent so as to prevent a stall of the engine.

The first predicting process S30 is followed by a first disengaging process S40 of disengaging the clutch, a second preparing process S50 of operating the accelerator pedal when the brake is maintained in an operated state, a torque restricting process S60 of restricting the engine torque raised by the accelerator pedal operated in the second preparing process S50 to a predetermined torque restriction value, a second driving process S70 of driving the actuator to engage the clutch that has been disengaged and causing the clutch to maintain a constant slip state, and a second predicting process S80 of measuring the stroke of the actuator and the resulting engine torque during the second driving process S70 and storing the measured torque as the clutch transfer torque based on the stroke of the actuator. Thereby, the clutch transfer torque on a torque region on which it is higher than the clutch transfer torque predicted in the idle state is predicted.

That is, as shown in FIG. 4, in the second preparing process S50, the accelerator pedal is operated to raise the engine torque while the brake is maintained in an operated state. The stroke of the clutch actuator is adjusted to maintain a slip so as to keep an engine speed constant while the engine torque is restricted to the torque restriction value or less in the torque restricting process S60. In this state, the engine torque is measured. The measured engine torque based on the actuator stroke is stored as the clutch transfer torque based on the actuator stroke.

The clutch transfer torque based on the actuator stroke is predicted in the idle state of the engine, i.e. on a region where the engine torque is lowest, in the first driving process S20 and the first predicting process S30 first, and then on a region where the engine torque is a bit higher in the second driving process S70 and the second predicting process S80.

Thus, the second driving process S70 and the second predicting process S80 are repetitively performed while the torque restriction value of the torque restricting process S60 is raised step by step. Thereby, the clutch transfer torque based on the actuator stroke on a region where the torque is raised step by step is stored. Then, the clutch transfer torque based on the actuator stroke can be obtained on all the desired engine torque regions.

In repetitively performing the second driving process S70 and the second predicting process S80, a second disengaging process S90 of disengaging the clutch is performed before the second driving process S70 is performed again after the second predicting process S80 is performed. The torque restriction value is set so as to allow all desired engine torque regions to be divided by a desired number using a test and analysis. However, it may be preferable to prevent a time required to predict the clutch transfer torque from being too long by dividing the regions into an excessive number of sections so as to be able to secure accuracy of the clutch transfer torque at a desired level. Thus, it is desirable to repeat the second driving process S70 and the second predicting process S80 twice, or three times.

For reference, when a vehicle is completely assembled in a vehicle assembly line, the method of predicting transfer torque may preferably be performed by a worker. FIGS. 3 and 4 show a process of sequentially predicting the transfer torques of two clutches, i.e. first and second clutches, in a double clutch transmission (DCT) vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of predicting transfer torque of a dry clutch in a vehicle, comprising:
   a first preparing process (S10) of operating a brake by a worker after an engine is started;
   a first driving process (S20) of driving an actuator by a controller to engage a clutch that has been disengaged; and
   a first predicting process (S30) of measuring, by the controller, a stroke of the actuator and a resulting engine torque during performing of the first driving process (S20) and storing, by the controller, a measured torque as clutch transfer torque based on the stroke of the actuator,
   wherein the first driving process (S20) and the first predicting process (S30) are performed when the engine is in an idle state, and
   wherein the first driving process (S20) includes a maintenance period in which the stroke of the actuator is maintained with no change while the actuator is driven to engage the clutch and then to disengage the clutch.

2. The method according to claim 1, further comprising, after the first predicting process (S30) is performed:
   a first disengaging process (S40) of disengaging the clutch;
   a second preparing process (S50) of operating the accelerator pedal when the brake is maintained in an operated state;
   a torque restricting process (S60) of restricting the engine torque raised by the accelerator pedal operated in the second preparing process (S50) to a predetermined torque restriction value;
   a second driving process (S70) of driving the actuator to engage the clutch that has been disengaged and causing the clutch to maintain a constant slip state; and
   a second predicting process (S80) of measuring the stroke of the actuator and the resulting engine torque during performing of the second driving process (S70) and storing the measured torque as the clutch transfer torque based on the stroke of the actuator.

3. The method according to claim 2, wherein the second driving process (S70) and the second predicting process (S80) are repetitively performed while the torque restriction value of the torque restricting process (S60) is raised step by step, and thus the clutch transfer torque based on the actuator stroke on a region where the torque is raised step by step is stored.

4. The method according to claim 3, further comprising a second disengaging process (S90) of disengaging the clutch before the second driving process (S70) is performed again after the second predicting process (S80) is performed.

* * * * *